US012738847B2

(12) United States Patent
Shin

(10) Patent No.: US 12,738,847 B2
(45) Date of Patent: Sep. 15, 2026

(54) BUCK CONVERTER, METHOD OF OPERATING THE SAME AND ELECTRONIC DEVICE INCLUDING THE SAME

(71) Applicant: Samsung Electronics Co., Ltd., Suwon-si (KR)

(72) Inventor: Hongseok Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 18/909,411

(22) Filed: Oct. 8, 2024

(65) Prior Publication Data

US 2025/0239940 A1 Jul. 24, 2025

(30) Foreign Application Priority Data

Jan. 22, 2024 (KR) ........................ 10-2024-0009447
Mar. 13, 2024 (KR) ........................ 10-2024-0034867

(51) Int. Cl.
*H02M 3/158* (2006.01)
*H02M 1/00* (2007.01)
*H02M 3/156* (2006.01)

(52) U.S. Cl.
CPC ......... *H02M 3/158* (2013.01); *H02M 1/0009* (2021.05); *H02M 3/1566* (2021.05)

(58) Field of Classification Search
CPC ... H02M 1/0009; H02M 3/1566; H02M 3/158
See application file for complete search history.

(56) References Cited

U.S. PATENT DOCUMENTS 7,812,585 B2 10/2010 Zhou et al.
9,293,988 B2 3/2016 Lee et al.
9,548,651 B2 * 1/2017 Guo ........................ H02M 1/08
10,110,122 B2 10/2018 Bari et al.
10,840,803 B2 11/2020 Toni et al.
11,362,579 B2 6/2022 Hrinya et al.
11,394,301 B1 * 7/2022 Lisuwandi .......... H02M 3/1566
2013/0015830 A1 * 1/2013 Zhang ................ H02M 3/1588 323/282
2014/0361755 A1 * 12/2014 Tateishi ............. H02M 3/1588 323/271
2017/0302174 A1 * 10/2017 Yan ..................... H02M 3/1584
2024/0295892 A1 * 9/2024 Kleine .................... G05F 1/462

FOREIGN PATENT DOCUMENTS

KR 101798113 B1 11/2017
KR 10-1946386 B1 2/2019

* cited by examiner

*Primary Examiner* — Fred E Finch, III
(74) *Attorney, Agent, or Firm* — Fish & Richardson P.C.

(57) ABSTRACT

A buck converter includes a power switching circuit that alternately transfers an input voltage and a ground voltage to an output terminal in response to a pulse switching signal, an LC filter, one end of which is connected to the output terminal, a sensing voltage generator that generates voltages corresponding to changes in an inductor current between the output terminal and a second end of the inductor, and an overshooting detector that generates a switching off signal in response to the voltages and a first reference voltage.

20 Claims, 13 Drawing Sheets

I_LOAD
I_L
$\Delta Vout = \frac{\Delta I}{C_L}$
Heavy load
light load 100
101
10
20
30
40
50
60
Vin
Vss
T0
TF
L
$C_L$
Vout
$I_{LOAD}$
Va
Vb
Vref1
Vs
Ton
PWM
S_OFF

FIG. 4

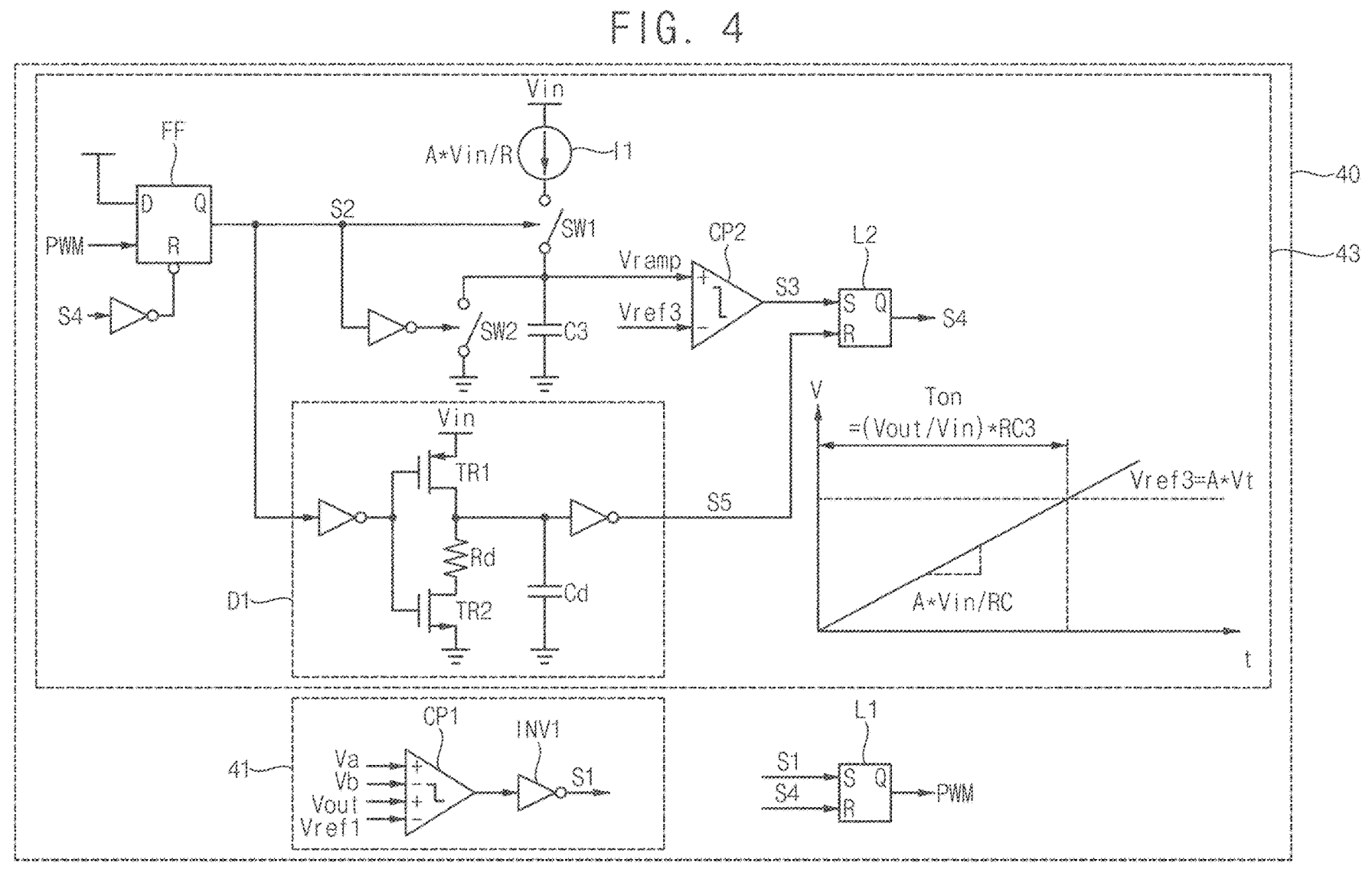

40
43
Vin
I1
A*Vin/R
SW1
SW2
C3
Vramp
Vref3
CP2
S3
L2
S Q R
S4
S5
Vref3=A*Vt
t
Ton
=(Vout/Vin)*RC3
A*Vin/RC
V
FF
D Q R
PWM
S4
S2
Vin
TR1
Rd
TR2
Cd
D1
Va
Vb
Vout
Vref1
CP1
INV1
S1
41
L1
S Q R
S1
S4
PWM

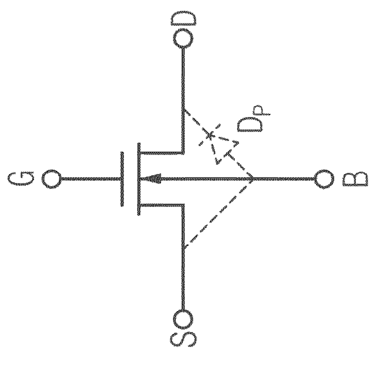
G
D
$D_P$
B
S
FIG. 7
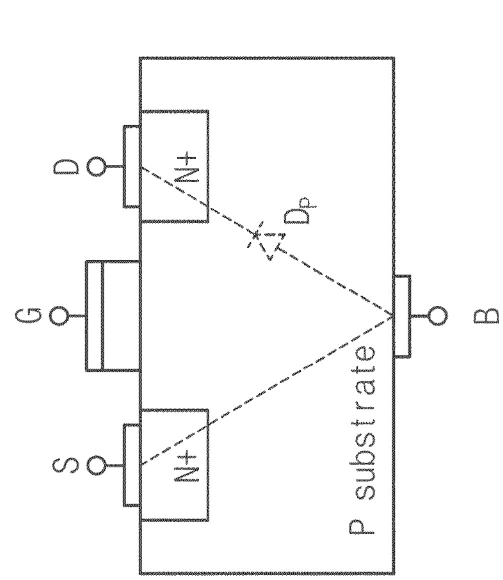
D
G
S
N+
N+
$D_P$
B
P substrate $I_L$
$I_{LOAD}$
I(A)
10.608
-0.0814
V(V)
1.133
1.083
Vout
V(V)
5.5
-0.5
Vb-Va
Vs
P2
V(mV)
63.6
-13.8
Vb-Va > Vs
Vb-Va < Vs
V(V)
5.5
-0.5
S8
V(V)
5.5
-0.5
S9
V(V)
5.5
-0.5
P2B
V(V)
5.5
-0.5
S_OFF
1.4925
1.495
1.4975
1.5
1.5025
1.505
1.5075
1.51
1.5125
1.515
1.5175
1.52
1.5225
Heavy load
t0
Overshooting state
t1
light load I(A)
7.0
5.0
3.0
1.0
V(mV)
40.0
0.0
-40.0
V(V)
5.0
4.0
3.0
2.0
1.0
0.0
$I_{LOAD}$
$I_L$
Vs
Vb-Va
Vb-Va > Vs
S_OFF
1.498
1.499
1.5
1.501
1.502
1.503
1.504
t0

500
300
Vout
20
$C_L$
L
101
Vin
Vss
CONTROLLER
400

BUCK CONVERTER, METHOD OF OPERATING THE SAME AND ELECTRONIC DEVICE INCLUDING THE SAME

CROSS-REFERENCE TO RELATED APPLICATION

This application claims priority under 35 USC § 119 to Korean Patent Application No. 10-2024-0009447 filed on Jan. 22, 2024 and to Korean Patent Application No. 10-2024-0034867 filed on Mar. 13, 2024 in the Korean Intellectual Property Office (KIPO), the contents of which are herein incorporated by reference in their entirety.

BACKGROUND

1. Technical Field

Example embodiments relate generally to voltage converters, and more particularly to buck converters configured to generate accurate and stable output voltages, methods of operating the buck converters, and electronic devices including the buck converters.

2. Description of the Related Art

Electronic devices may include a variety of semiconductor devices, and each of the semiconductor devices may require an appropriate direct current (DC) voltage. In addition, electronic devices may include a semiconductor device, which is referred to as a power management integrated chip (PMIC), for generating a DC voltage required by each semiconductor device. The PMIC may include at least one DC-DC converter that generates an output DC voltage desired by at least one semiconductor device based on an input DC voltage. A buck converter (e.g., a switching regulator), which is a type of DC-DC converters, may generate an output voltage having a voltage level lower than that of an input voltage. Researches have been conducted to improve the accuracy of output voltage regardless of a load current and to improve the transient response characteristic when the load current changes.

SUMMARY

At least one example embodiment of the present disclosure provides buck converters capable of reducing or minimizing overshooting on an output voltage when a load current is changed from a relatively heavy load current to a relatively light load current.

At least one example embodiment of the present disclosure provides methods of operating the buck converter.

At least one example embodiment of the present disclosure provides electronic devices including the buck converter.

According to example embodiments, a buck converter includes a power switching circuit, an inductor, a sensing voltage generator, and an overshooting detector. The power switching circuit includes a high side (HS) switch and a low side (LS) switch, and alternately transfers an input voltage and a ground voltage to an output terminal through the HS switch and the LS switch in response to a pulse switching signal. The inductor has a first end connected to the output terminal and a second end connected to a load capacitor, and generates an output voltage at the second end. The sensing voltage generator generates a first voltage and a second voltage, includes a first resistor and a first capacitor connected in series between the output terminal and the second end of the inductor, and includes a second resistor and a second capacitor connected in series between the first common node and the second end of the inductor. The first voltage is a voltage at a first common node between the first resistor and the first capacitor. The second voltage is a voltage at a second common node between the second resistor and the second capacitor. The overshooting detector generates a switching off signal in response to a first reference voltage, the first voltage and the second voltage. The overshooting detector is configured to generate the first reference voltage based on replicating a current flowing through the first common node during a half of a turn-on time interval of the HS switch. The power switching circuit is further configured to, based on the switching off signal being in a first state, the HS switch and the LS switch are alternately turned on in response to the pulse switching signal, and based on the switching off signal being in a second state, the LS switch is turned off.

According to example embodiments, in a method of operating a buck converter, a reference voltage corresponding to a half of an amount of change in an inductor current in a steady state is generated. A first voltage corresponding to an amount of change in the inductor current due to a change in a load current is generated. A first state in which the first voltage is higher than the reference voltage is sensed. A low side (LS) switch is turned off in response to the first state regardless of a pulse switching signal. The LS switch is included in a power switching circuit included in the buck converter.

According to example embodiments, an electronic device includes a first semiconductor chip, an inductor, a load capacitor and a second semiconductor chip. The first semiconductor chip includes a power switching circuit including a high side (HS) switch and a low side (LS) switch. The inductor and the load capacitor are connected to an output terminal of the power switching circuit, and generates an output voltage. The second semiconductor chip receives the output voltage as a power supply voltage, and consumes a load current. The first semiconductor chip configured to generate a reference voltage corresponding to an amount of change in an inductor current flowing through the inductor during a half of a turn-on time interval of the HS switch, generate a first voltage corresponding to an amount of change in the inductor current due to a change in the load current, and adjust a slope of decreasing the inductor current depending on the reference voltage and the first voltage.

In the buck converter according to example embodiments, the stable output voltage may be generated regardless of the load current. For example, even when the operating state is changed from consuming a relatively heavy load current to consuming a relatively light load current, the overshooting on the output voltage may be minimized or reduced quickly and stably. Accordingly, overall performance may be improved or enhanced.

BRIEF DESCRIPTION OF THE DRAWINGS

Illustrative, non-limiting example embodiments will be more clearly understood from the following detailed description taken in conjunction with the accompanying drawings.

FIG. 4 is a circuit diagram illustrating an example of a pulse switching signal generator in FIG. 2.

FIG. 7 is a diagram illustrating an example of a parasitic diode in a MOSFET included in an LS switch.

FIG. 12 is a block diagram illustrating an electronic device including a buck converter according to example embodiments.

DETAILED DESCRIPTION OF THE EMBODIMENTS

Figure 1:
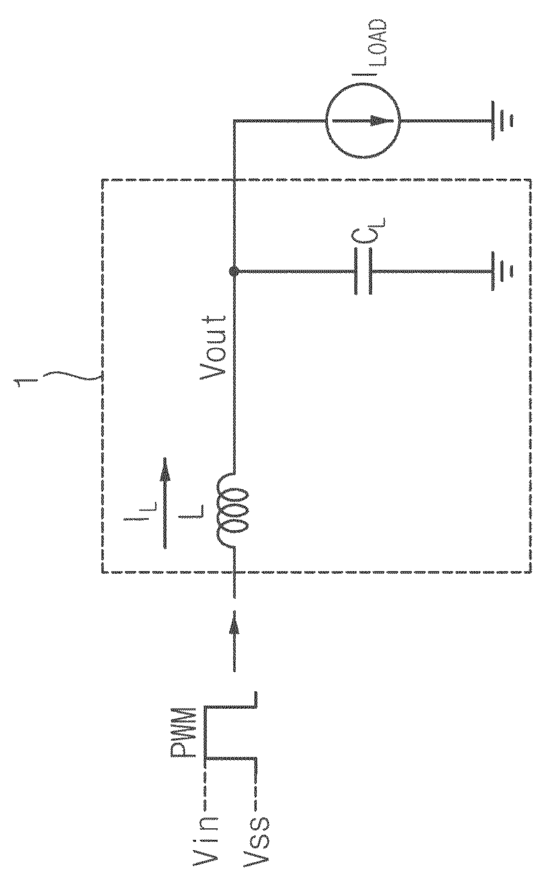
FIG. 1 is a diagram for describing overshooting on an output voltage of a DC-DC converter.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a diagram for describing overshooting on an output voltage of a DC-DC converter.

Referring to FIG. 1, to supply a load current $I_{LOAD}$ to a load device (not illustrated), a DC-DC converter 1 may generate an output voltage Vout to a load capacitor $C_L$ by flowing an inductor current $I_L$ through an inductor L in response to a pulse switching signal PWM. For example, the DC-DC converter 1 may be a buck converter. The DC-DC converter 1 may generate the output voltage Vout having a constant (or fixed) voltage level by repeatedly increasing and decreasing the inductor current $I_L$ in response to the pulse switching signal PWM.

In a transition state in which the load current $I_{LOAD}$ of the load device changes from a relatively heavy (or large) load current to relatively a light (or small) load current, the inductor current $I_L$ may become greater than the load current $I_{LOAD}$, and then overshooting may occur, causing the output voltage Vout to increase. In FIG. 1, a current ΔI in a hatched region may be accumulated in the load capacitor $C_L$, and the overshooting may occur on the output voltage Vout by the amount of change ΔVout in the output voltage Vout. The amount of change ΔVout in the output voltage Vout, e.g. the overshooting on the output voltage Vout may be expressed by Equation 1.

$$\Delta \text{Vout} = \frac{\Delta I}{C_L} \quad \text{[Equation 1]}$$

In Equation 1, ΔVout denotes the amount of change in the output voltage Vout, ΔI denotes a difference between the load current $I_{LOAD}$ and the inductor current $I_L$, and $C_L$ denotes a capacitance of the load capacitor $C_L$. Since the value $C_L$ value is determined during the manufacturing process of the DC-DC converter 1, the value ΔI should be reduced to minimize (or reduce) the overshooting on the output voltage Vout (e.g., to reduce the value ΔVout).

Figure 2:
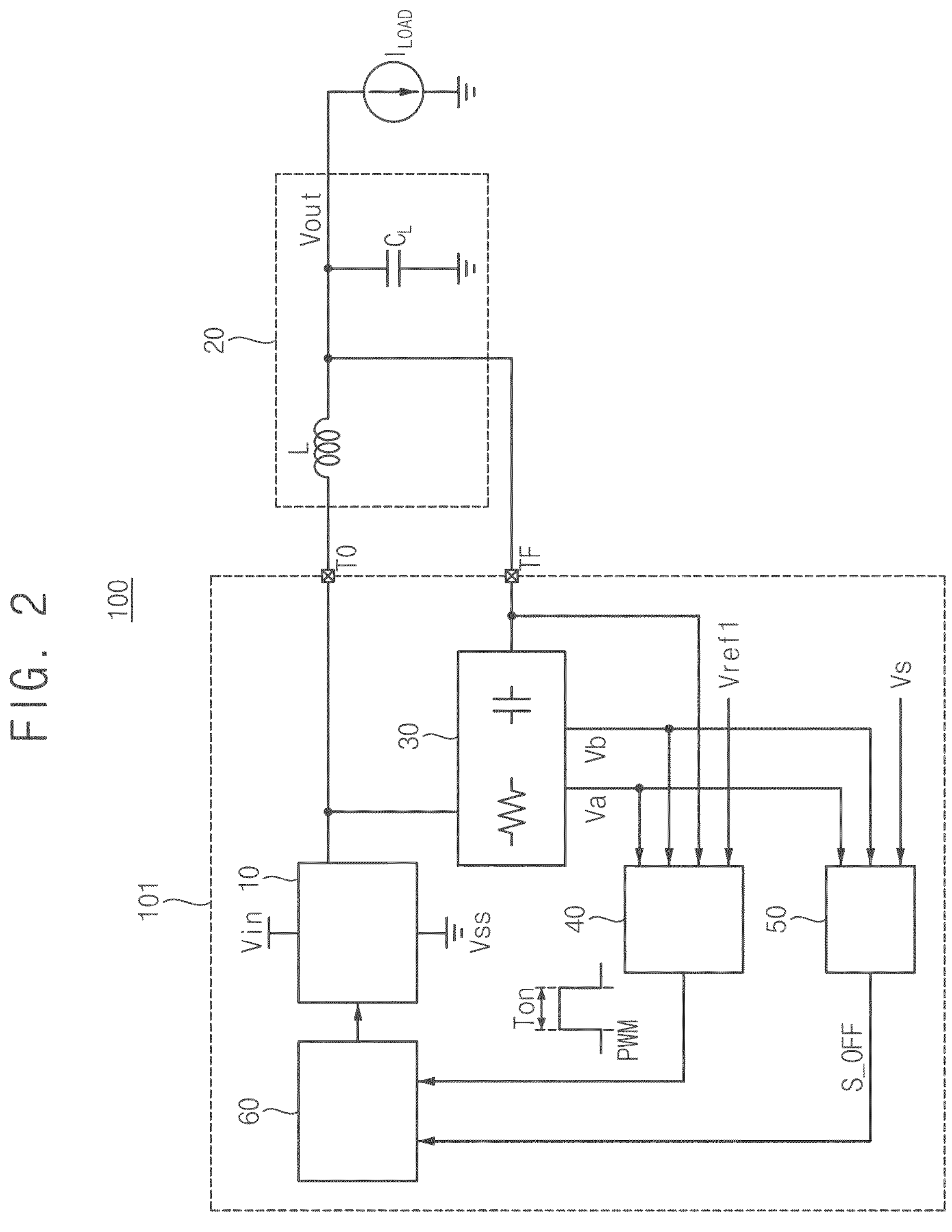
FIG. 2 is a block diagram illustrating a buck converter according to example embodiments.

FIG. 2 is a block diagram illustrating a buck converter according to example embodiments.

Referring to FIG. 2, a buck converter 100 may include a semiconductor chip 101 and an LC filter (or low pass filter) 20. The semiconductor chip 101 may include an output terminal TO, a feedback terminal TF, a power switching circuit 10, a sensing voltage generator 30, a pulse switching signal generator 40, an overshooting detector 50 and a driver circuit 60. For example, the semiconductor chip 101 and the LC filter 20 may be mounted together on a printed circuit board (PCB) (not illustrated).

The buck converter 100 may be an example of a DC-DC converter according to example embodiments. In other words, the DC-DC converter according to example embodiments may be or may include a buck converter. The buck converter 100 may be electrically connected to a load device (not illustrated) that consumes a load current $I_{LOAD}$, and may supply the load current $I_{LOAD}$ to the load device. For example, the buck converter 100 may generate an output voltage Vout by reducing an input voltage Vin using the semiconductor chip 101 and the LC filter 20, and a voltage level of the output voltage Vout may be lower than a voltage level of the input voltage Vin.

The power switching circuit 10 may include a high side (HS) switch and a low side (LS) switch, and may alternately transfer (or transmit) the input voltage Vin and a ground voltage Vss to the output terminal TO in response to a pulse switching signal PWM. For example, both the HS switch and the LS switch may be implemented with metal oxide semiconductor field effect transistors (MOSFETs). Although not illustrated in FIG. 2, the semiconductor chip 101 may further include input terminals for receiving the input voltage Vin and the ground voltage Vss.

The LC filter 20 may include an inductor L having a first end (or one end) connected to the output terminal TO and a second end (or other end) connected to a load capacitor $C_L$, and may generate the output voltage Vout at the second end of the inductor L.

The sensing voltage generator 30 may generate a first voltage Va that is obtained by reflecting the output voltage Vout and an inductor current $I_L$ flowing through the inductor L, and may generate a second voltage Vb that is obtained by reflecting the output voltage Vout and only a direct current (DC) component of the inductor current $I_L$. For example, the inductor current $I_L$ may include the DC component corresponding to the load current $I_{LOAD}$ and an alternating current (AC) component corresponding to the switching operation of the power switching circuit 10. For example, the sensing voltage generator 30 may include an RC filter including a resistor and a capacitor, and may generate the first voltage Va and the second voltage Vb using the RC filter. Detailed configuration of the sensing voltage generator 30 will be described with reference to FIG. 3.

The pulse switching signal generator 40 may generate the pulse switching signal PWM in response to the output voltage Vout, the first voltage Va, the second voltage Vb and a first reference voltage Vref1. The pulse switching signal PWM may be activated, may maintain an activation state for a predetermined (or, alternatively, desired or selected) time interval Ton, and then may be deactivated. For example, the first reference voltage Vref1 may be or may correspond to a target voltage of the buck converter 100. During the predetermined (or, alternatively, desired or selected) time interval Ton while the pulse switching signal PWM is activated, the HS switch included in the power switching circuit 10 may be turned on, and the inductor current $I_L$ flowing through the inductor L may increase. In other words, the activation time interval Ton of the pulse switching signal PWM may be equal or substantially equal to a turn-on time interval of the HS switch. During a deactivation time interval of the pulse switching signal PWM (or while the pulse switching signal PWM is deactivated), the LS switch included in the power switching circuit 10 may be turned on, and the inductor current $I_L$ flowing through the inductor L may decrease.

The overshooting detector 50 may generate a switching off signal S_OFF in response to the first voltage Va, the second voltage Vb and a second reference voltage Vs. For example, the second reference voltage Vs may be a voltage generated by replicating or simulating a current (e.g., the inductor current $I_L$) flowing through the inductor L during a half of the turn-on time interval of the HS switch, e.g., during a half of the activation time interval Ton of the pulse switching signal PWM. For example, the second reference voltage VS may be a voltage corresponding to a half of the amount of change in the inductor current $I_L$ in a steady state. A voltage (Vb−Va) obtained by subtracting the first voltage Va from the second voltage Vb may vary or may be changed with respect to (or around) about or exactly 0V depending on the change in the increase and decrease of the inductor current $I_L$.

In the steady state in which the load current $I_{LOAD}$ is constant or fixed, the voltage (Vb−Va) may be lower than or equal to the second reference voltage Vs. When the load current $I_{LOAD}$ is transitioned or changed from a relatively heavy load current to a relatively light load current, and when the inductor current $I_L$ becomes larger, the voltage (Vb−Va) may become higher than the second reference voltage Vs. The overshooting detector 50 may detect when the voltage (Vb−Va) becomes higher than the second reference voltage Vs, and may determine that the overshooting has occurred on the output voltage Vout at such time point at which the voltage (Vb−Va) becomes higher than the second reference voltage Vs. In other words, when the voltage formed by the change in the current flowing through the inductor L is higher than the voltage replicated by the inductor current $I_L$ flowing for a half of the turn-on time interval (e.g., Ton/2) of the HS switch in the steady state (e.g., is higher than the second reference voltage Vs), it may be determined that the overshooting has occurred on the output voltage Vout. The overshooting detector 50 may detect when the voltage (Vb−Va) becomes higher than the second reference voltage Vs, and may change a state of the switching off signal S_OFF from a first state to a second state in response to such detection. For example, the first state may represent or indicate that the switching off signal S_OFF has a logic high level and that the buck converter 100 is operating in the steady state. For example, the second state may represent or indicate that the switching off signal S_OFF has a logic low level and that the overshooting has occurred on the output voltage Vout of the buck converter 100. Detailed configuration of the overshooting detector 50 will be described with reference to FIG. 3.

The driver circuit 60 may receive the pulse switching signal PWM and the switching off signal S_OFF, and may drive the power switching circuit 10. For example, when the switching off signal S_OFF is in the first state (e.g., when it represents that the buck converter 100 is in the steady state), the driver circuit 60 may drive the power switching circuit 10 in response to the pulse switching signal PWM. For example, when the switching off signal S_OFF is in the second state (e.g., when it represents that the buck converter 100 is in the overshooting state), the driver circuit 60 may turn off both the HS switch and the LS switch included in the power switching circuit 10 regardless of (for example, independently of or without a condition to) the pulse switching signal PWM. For example, when the MOSFET included in the LS switch is turned off, a parasitic diode in the MOSFET may be turned on. When the parasitic diode is turned on, a voltage difference between the output terminal TO and the second end of the inductor L may increase by a built-in voltage of the parasitic diode, and thus the current flowing through the inductor L may decreases faster than when the MOSFET is turned on. When the current flowing through the inductor L decreases more quickly, the current ΔI in the hatched region of FIG. 1 may be reduced, and thus the overshooting on the output voltage Vout may be reduced or minimized.

In other words, the buck converter 100 of FIG. 2 may detect the overshooting using the amount of change in the inductor current $I_L$, and may turn off the LS switch included in the power switching circuit 10 to reduce the inductor current $I_L$ more quickly, thereby reducing ΔI in FIG. 1 and minimizing or reducing the overshooting. In addition, the buck converter 100 of FIG. 2 may detect the overshooting with a 90-degree faster phase using the amount of change in the inductor current $I_L$, rather than using the output voltage Vout.

Figure 3:
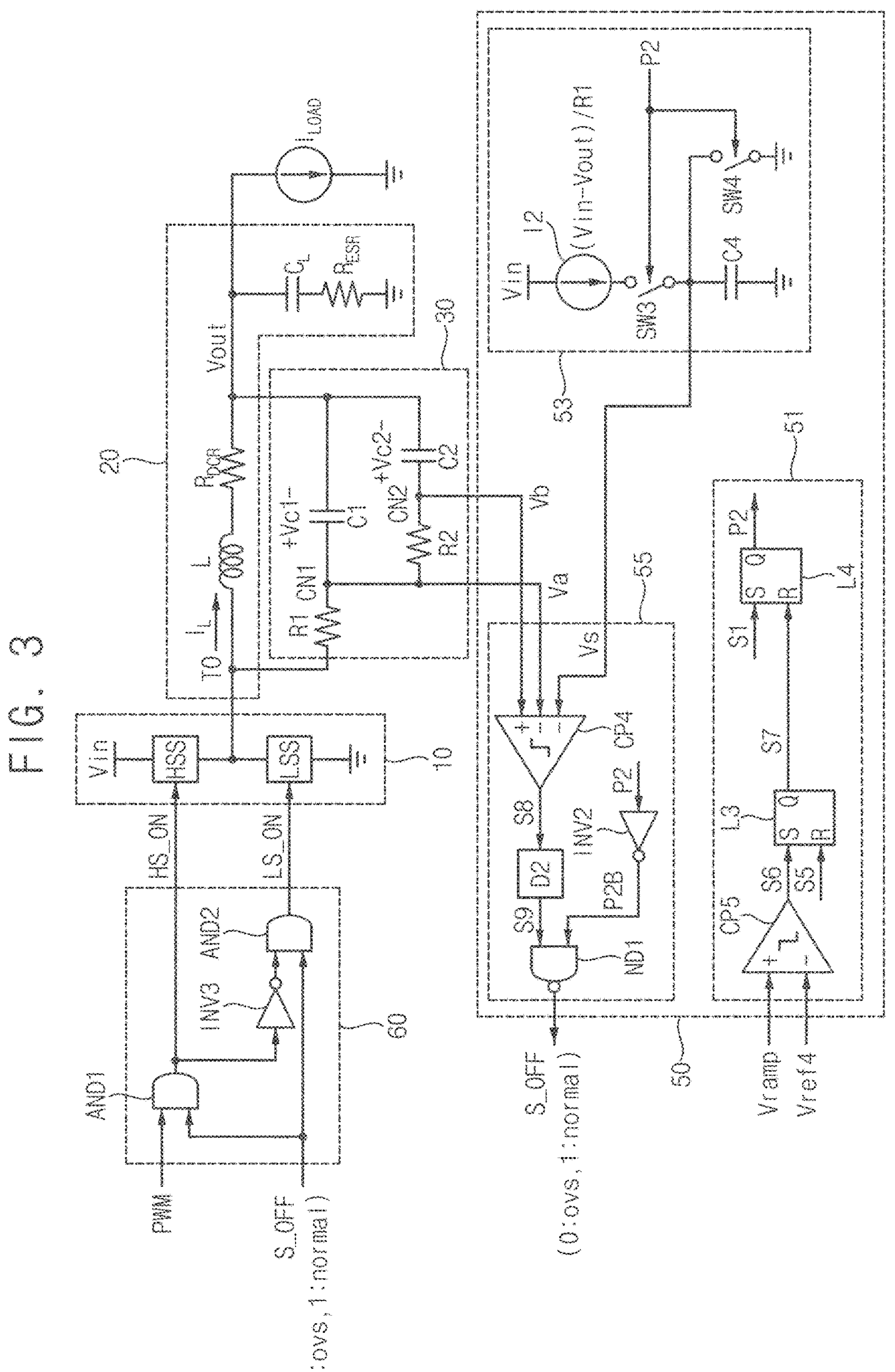
FIG. 3 is a circuit diagram illustrating an example of a power switching circuit, an LC filter, a sensing voltage generator, an overshooting detector, and a driver circuit in FIG. 2.
Figure 5:
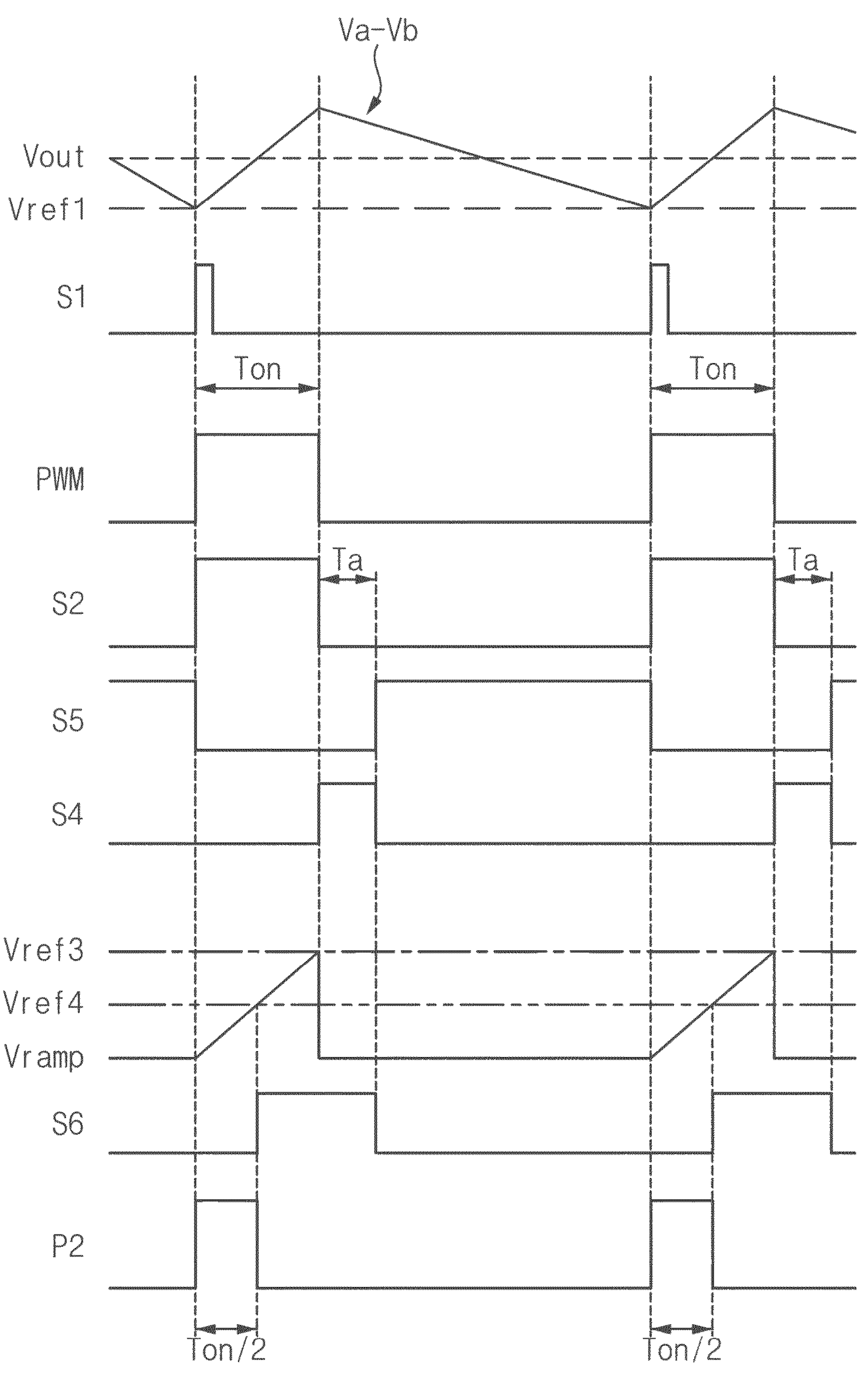
FIG. 5 is a timing diagram illustrating an example of signals associated with a pulse switching signal generator of FIG. 4.
Figure 6:
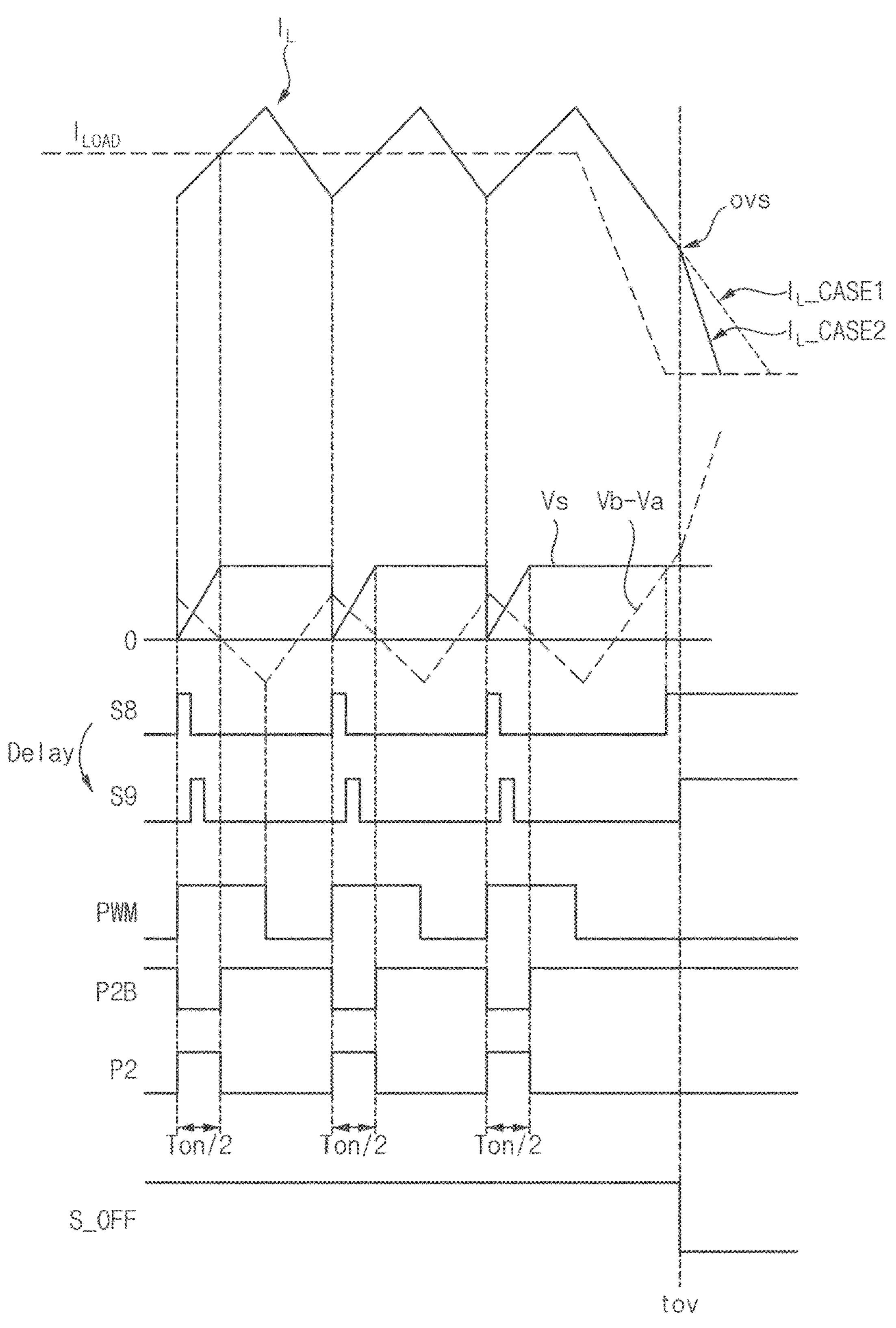
FIG. 6 is a timing diagram illustrating an example of signals associated with an overshooting detector in FIG. 3.

FIG. 3 is a circuit diagram illustrating an example of the power switching circuit 10, the LC filter 20, the sensing voltage generator 30, the overshooting detector 50 and the driver circuit 60 in FIG. 2. FIG. 4 is a circuit diagram illustrating an example of the pulse switching signal generator 40 in FIG. 2. FIG. 5 is a timing diagram illustrating an example of signals associated with the pulse switching signal generator 40 of FIG. 4. FIG. 6 is a timing diagram illustrating an example of signals associated with the overshooting detector 50 in FIG. 3. Hereinafter, a configuration and an operation of the buck converter of FIG. 2 will be described in detail with reference to FIGS. 3 through 6.

Referring to FIG. 3, the power switching circuit 10 may include a HS switch HSS and a LS switch LSS, and may alternately transfer or output the input voltage Vin and the ground voltage Vss to the output terminal TO in response to switching signals HS_ON and LS_ON. In FIG. 3 and subsequent figures, three parallel straight lines with different lengths connected to the LS switch LSS may represent the ground voltage Vss. For example, each of the HS switch HSS and the LS switch LSS may include a MOSFET. For example, a MOSFET included in the LS switch LSS may include a parasitic diode formed between a source and a drain by connecting the source and a body in common. The LS switch LSS will be described with reference to FIG. 7.

The LC filter 20 may include the inductor L and the load capacitor $C_L$. For example, the inductor L may be modeled to include a direct current resistor (DCR) $R_{DCR}$ connected in series with the inductor L, and the load capacitor $C_L$ may be modeled to include an equivalent series resistor (ESR) $R_{ESR}$ connected in series with the load capacitor $C_L$. The direct current resistor $R_{DCR}$ and the equivalent series resistor $R_{ESR}$ may not be included in real products (e.g., the direct current resistor $R_{DCR}$ and the equivalent series resistor $R_{ESR}$ may be parasitic components). Hereinafter, the direct current resistor $R_{DCR}$ will be described as not existing when describing a physical connection of the inductor L in the buck converter 100.

The sensing voltage generator 30 may include a first resistor R1, a first capacitor C1, a second resistor R2 and a second capacitor C2. The first resistor R1 and the first capacitor C1 may be connected in series between the output terminal TO and the second end of the inductor L, and a first common node CN1 may be a node connected to and between the first resistor R1 and the first capacitor C1. The second resistor R2 and the second capacitor C2 may be connected in series between the first common node CN1 and the second end of the inductor L, and a second common node CN2 may be a node connected to and between the second resistor R2 and the second capacitor C2. The first voltage Va may be a voltage at the first common node CN1, and may be the sum of the output voltage Vout and a voltage Vc1 reflecting the DC component and the AC component of the inductor current $I_L$. The second voltage Vb may be a voltage at the second common node CN2, and may be the sum of the output voltage Vout and a voltage Vc2 reflecting only the DC component of the inductor current $I_L$. For example, the DC component of the inductor current $I_L$ may correspond to the load current $I_{LOAD}$, and the AC component of the inductor current $I_L$ may correspond to the ripple component, which is the amount of change in the inductor current $I_L$ due to the switching of the power switching circuit 10.

Referring to FIG. 4, the pulse switching signal generator 40 may include a set generator 41, a reset generator 43 and a latch L1.

The set generator 41 may include a comparator CP1 and an inverter INV1. The set generator 41 may operate in response to the voltage Va at the first common node CN1, the voltage Vb at the second common node CN2, the output voltage Vout and the first reference voltage Vref1. The inverter INV1 may operate in response to an output of the comparator CP1. The comparator CP1 and the inverter INV1 may generate a first signal S1. The first signal S1 may be activated to a logic high level when (Va−Vb)+Vout is lower than or equal to Vref1, and may be deactivated to a logic low level when (Va−Vb)+Vout is higher than Vref1. In other words, the first signal S1 may be activated when the sum of the output voltage Vout and the voltage caused by the ripple component of the inductor current $I_L$ is equal to or lower than the first reference voltage Vref1, and may be deactivated otherwise. In the timing diagram of FIG. 5, it can be seen that the first signal S1 may be activated and deactivated in response to the voltage obtained by subtracting the voltage Va at the first common node CN1 from the voltage Vb at the second common node CN2, the output voltage Vout and the first reference voltage Vref1.

The latch L1 may receive the first signal S1 as a set signal at a set node, and may activate the pulse switching signal PWM to a logic high level when the first signal S1 is activated. In the timing diagram of FIG. 5, it can be seen that the pulse switching signal PWM is activated when the first signal S1 is activated.

The reset generator 43 may include a flip-flop FF, a current source I1, a capacitor C3, a comparator CP2, a latch L2 and a delay circuit D1. A configuration and an operation of the reset generator 43 will be described with reference to FIGS. 4 and 5 together.

The flip-flop FF may generate a second signal S2 that is activated when the pulse switching signal PWM is activated. The current source I1 may generate a current of (A*Vin)/R that is proportional to the input voltage Vin. The capacitor C3 may generate a ramp voltage Vramp by accumulating the current from the current source I1 during an activation time interval of the second signal S2. Switches SW1 and SW2 may be disposed between the current source I1 and the capacitor C3. For example, the connection and/or disconnection of the current source I1 and the capacitor C3 may be controlled by the switches SW1 and SW2 such that the current from the current source I1 is accumulated in the capacitor C3 during the activation time interval of the second signal S2 and the capacitor C3 is discharged during a deactivation time interval of the second signal S2.

The comparator CP2 may generate a third signal S3 in response to the ramp voltage Vramp and a third reference voltage Vref3. For example, the third reference voltage Vref3 may be A*Vt that is proportional to a target voltage Vt of the buck converter. For example, a proportional coefficient (e.g., A) of the current source I1 to the input voltage Vin and a proportional coefficient (e.g., A) of the third reference voltage Vref3 to the target voltage Vt may be equal to each other. For example, the target voltage Vt may be equal or substantially equal to the first reference voltage Vref1. For example, the target voltage Vt may be equal or substantially equal to the output voltage Vout. The comparator CP2 may activate the third signal S3 to a logic high level when the ramp voltage Vramp becomes equal to the third reference voltage Vref3. The latch L2 may receive the third signal S3 as a set signal at a set node, and may activate a fourth signal S4 to a logic high level when the third signal S3 is activated.

The latch L1 may receive the fourth signal S4 as a reset signal at a reset node, and may deactivate the pulse switching signal PWM when the fourth signal S4 is activated.

The flip-flop FF may deactivate the second signal S2 in response to the activation of the fourth signal S4. The delay circuit D1 may generate a fifth signal S5 based on the second signal S2. To delay the deactivation transfer of the second signal S2, the delay circuit D1 may include inverters each of which includes a capacitor Cd, a resistor Rd, and transistors TR1 and TR2. For example, the fifth signal S5 may have a phase generally opposite to that of the second signal S2, a length of a deactivation time interval of the fifth signal S5 may increase by a time interval Ta as compared with a length of an activation time interval of the second signal S2, and the time interval Ta may be determined by delay components of the capacitor Cd and the resistor Rd that are included in the delay circuit D1. The latch L2 may receive the fifth signal S5 as a reset signal at a reset node, and may deactivate the fourth signal S4 when the fifth signal S5 is activated. The delay components of the capacitor Cd and the resistor Rd that are included in the delay circuit D1 may ensure the minimum activation time interval Ta of the fourth signal S4. For example, the minimum activation time interval Ta of the fourth signal S4 may be used to ensure the minimum deactivation time interval of the pulse switching signal PWM and the minimum turn-on time interval of the LS switch LSS included in the power switching circuit 10.

The activation time interval Ton with a logic high level of the pulse switching signal PWM generated by the pulse switching signal generator 40 of FIG. 4 may be obtained based on Equation 2.

$$\mathrm{Ton} = (\mathrm{Vout}/\mathrm{Vin}) * RC3 \quad \text{[Equation 2]}$$

In Equation 2, Ton denotes the activation time interval of the pulse switching signal PWM, Vout denotes the output voltage, Vin denotes the input voltage, R denotes a resistance of the current source I1, and C3 denotes a capacitance of the capacitor C3. While the buck converter 100 is operating, the activation time interval Ton of the pulse switching signal PWM may be changed depending on at least the voltage level of the input voltage Vin. A control scheme in which the activation time interval Ton of the pulse switching signal PWM is controlled, adjusted and/or changed while the buck converter 100 is operating may be referred to as an adaptive on-time (AOT) scheme.

However, example embodiments are not limited thereto. For example, the current source I1 included in the reset generator 43 of FIG. 4 may generate a constant current regardless of (for example, independently of or without a condition to) the input voltage Vin, and the activation time interval Ton of the pulse switching signal PWM may be fixed regardless of (for example, independently of or without a condition to) a change in the input voltage Vin. A control scheme in which the activation time interval Ton of the pulse switching signal PWM is fixed may be referred to as a constant on-time (COT) scheme. Example embodiments may be applied or employed to both the AOT scheme and the COT scheme.

Referring again to FIG. 3, the overshooting detector 50 may include a half signal generator 51, a first reference voltage generator 53 and a logic circuit 55. The half signal generator 51 may generate a half signal P2 having a pulse of a half of the activation time interval Ton of the pulse switching signal PWM. The first reference voltage generator 53 may generate a voltage by replicating the inductor current $I_L$ during a half of the activation time interval Ton. The logic circuit 55 may include a comparator CP4 and other components.

The half signal generator 51 may include a comparator CP5 and latches L3 and L4. The comparator CP5 may generate a sixth signal S6 in response to a fourth reference voltage Vref4, which is a half of the third reference voltage Vref3, and in response to the ramp voltage Vramp, which is generated from the pulse switching signal generator 40 of FIG. 4. The latch L3 may receive the sixth signal S6 as a set signal at a set node, and may generate a seventh signal S7 in response to the sixth signal S6. The latch L4 may receive the first signal S1 as a set signal at a set node, may activate the half signal P2 when the first signal S1 is activated, and may deactivate the half signal P2 in response to the seventh signal S7. As illustrated in FIG. 5, an activation time interval of the half signal P2 may be a half of the activation time interval Ton of the pulse switching signal PWM.

The first reference voltage generator 53 may include a current source 12 and a capacitor C4. The current source 12 may generate a current corresponding to (Vin−Vout)/R1. For example, Vout of the current source 12 may be equal or substantially equal to the target voltage Vt. The capacitor C4 may generate a half voltage Vs, which is the second reference voltage, by the current of the current source 12 during the activation time interval of the half signal P2. Switches SW3 and SW4 may be disposed between the current source 12 and the capacitor C4. For example, the connection and/or disconnection of the current source 12 and the capacitor C4 may be controlled by the switches SW3 and SW4 such that the half voltage Vs is generated as illustrated in FIG. 6. To generate the half voltage Vs by replicating the current flowing through the inductor L during a half of the activation time interval Ton during which the HS switch HSS is turned on, e.g., to generate the half voltage Vs that is equal to the voltage corresponding to a half of the amount of change in the inductor current flowing through the inductor L during the activation time interval Ton, a resistance of the current source 12 may be equal to the resistance of the first resistor R1 in the sensing voltage generator 30, and a capacitance of the capacitor C4 may be equal to the capacitance of the capacitor C1. Therefore, the second reference voltage, e.g., the half voltage Vs, may be accurately generated even if the input voltage Vin, the output voltage Vout, and/or the switching frequency changes.

Referring to FIG. 6, the half voltage Vs, which is the second reference voltage, generated in the capacitor C4 during the activation time interval of the half signal P2 is illustrated. The half voltage Vs may be reset to approximately 0V when the half signal P2 is activated, may increase during Ton/2, which is the activation time interval of the half signal P2, and then may maintain the increased voltage level until the half signal P2 is activated next time.

Referring again to FIG. 3, the comparator CP4 may generate an eighth signal S8 in response to the voltage Va at the first common node CN1, the voltage Vb at the second common node CN2 and the half voltage Vs, which is the second reference voltage. The comparator CP4 may compare the voltage (Vb−Va) obtained by subtracting the voltage Va from the voltage Vb voltage with the half voltage Vs, may activate the eighth signal S8 to a logic high level when the voltage (Vb−Va) becomes higher than the half voltage Vs, and may deactivate the eighth signal S8 to a logic low level when the voltage (Vb−Va) is less than the half voltage Vs. For example, the voltage (Vb−Va) may be calculated as (Vout+Vc2)−(Vout+Vc1), e.g., (Vc2−Vc1), which is obtained by subtracting the voltage of the DC and AC components of the inductor current $I_L$ from the voltage of the DC component of the inductor current $I_L$, and which represents the AC component. In other words, the voltage (Vb−Va) in FIG. 6 may be the same or substantially the same as (Vc2−Vc1), and may have an inverted phase of the ripple information of the capacitor Vc1 with respect to about or exactly 0V.

A NAND gate ND1 may receive a ninth signal S9 in which the eighth signal S8 is delayed by a delay circuit D2, may receive a signal P2B in which the half signal P2 is inverted by an inverter INV2, and may generate the switching off signal S_OFF in response to the ninth signal S9 and the signal P2B. When the half signal P2 has a logic high level, the switching off signal S_OFF may be in the first state (e.g., a logic high level), which represents the steady state. When the half signal P2 has a logic low level, the switching off signal S_OFF may be in the first state (e.g., a logic high level) or the second state (e.g., a logic low level), depending on the ninth signal S9.

The delay circuit D2 may be beneficial to prevent or reduce occurrences of the switching off signal S_OFF from toggling from the first state to the second state due to the logic high level of the eighth signal S8 and the logic high level of the signal P2B. In some example embodiments, the delay circuit D2 may be omitted. If the delay circuit D2 is omitted, the NAND gate ND1 may receive the eighth signal S8, may receive the signal P2B in which the half signal P2 is inverted by the inverter INV2, and may generate the switching off signal S_OFF in response to the eighth signal S8 and the signal P2B.

Referring to FIG. 6, the overshooting detector 50 may set the switching off signal S_OFF to the first state of the logic high level in the steady state in which the voltage (Vb−Va) is lower than the half voltage Vs, and may set the switching off signal S_OFF to the second state of the logic low level in the overshooting situation in which the voltage (Vb−Va) becomes higher than the half voltage Vs.

The driver circuit 60 may receive the pulse switching signal PWM and the switching off signal S_OFF, and may generate the switching signals HS_ON and LS_ON in response to the pulse switching signal PWM and the switching off signal S_OFF. For example, the driver circuit 60 may include AND gates AND1 and AND2 and an inverter INV3. When the switching off signal S_OFF is in the first state of the logic high level (e.g. before time point tov), the driver circuit 60 may generate the switching signals HS_ON and LS_ON such that the HS switch HSS is turned on and the LS switch LSS is turned off during the activation time interval Ton of the switching pulse signal PWM. When the switching off signal S_OFF is in the second state of the logic low level (e.g. after time point tov), the driver circuit 60 may generate the switching signals HS_ON and LS_ON such that both the HS switch HSS and the LS switch LSS are turned off. When the MOSFET included in the LS switch LSS is turned off, the parasitic diode of the MOSFET may be turned on to maintain the current flowing through the inductor L, and then the voltage across the inductor L may become higher, as compared with the MOSFET is turned on. Therefore, as illustrated in FIG. 6, an absolute value of a slope of decreasing the inductor current $I_L$ may increase when the switching off signal S_OFF is in the second state of the logic low level (e.g., in ovs state after time point tov), thereby minimizing or reducing the overshooting. In FIG. 6, $I_L$_CASE1, which is illustrated by a dotted line after time point tov and has a relatively small absolute value of the slope of decreasing the inductor current $I_L$, may represent an inductor current of a conventional buck converter, and $I_L$_CASE2, which is illustrated by a solid line after time point tov and has a relatively large absolute value of the slope of decreasing the inductor current $I_L$, may represent the inductor current of the buck converter according to example embodiments.

FIG. 7 is a diagram illustrating an example of a parasitic diode in a MOSFET included in an LS switch.

Referring to FIG. 7, a structure of an n-type MOSFET in which voltages of a source S and a body B are commonly connected is illustrated, A parasitic diode Dp may be formed between the source S and a drain D. Even if a turn-off voltage is applied to a gate G voltage, the parasitic diode Dp may be turned on by the voltages of the source S and a drain D.

Figure 8A:
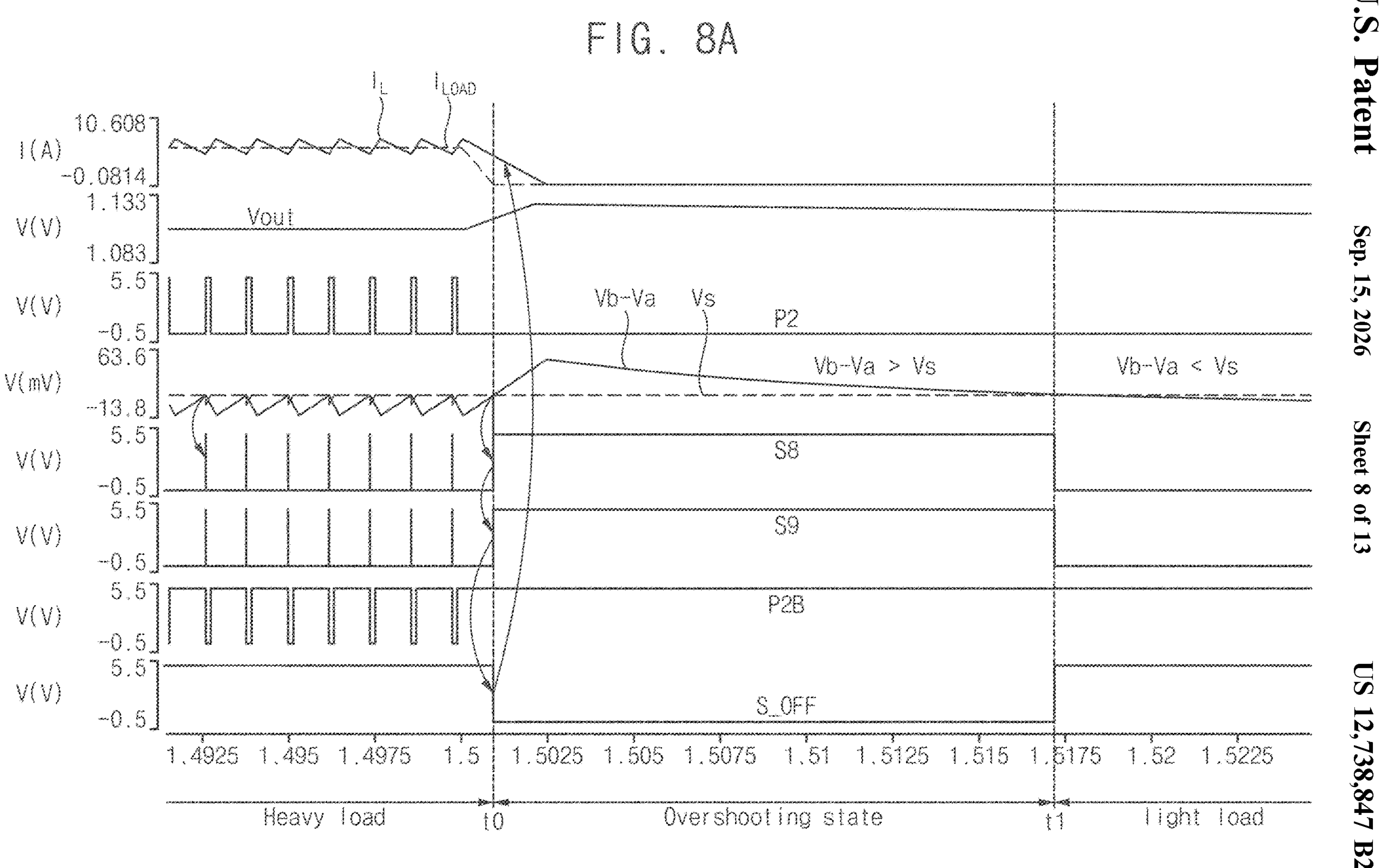
FIG. 8A is a timing diagram illustrating an operation of a buck converter according to example embodiments due to a change in a load current.
Figure 8B:
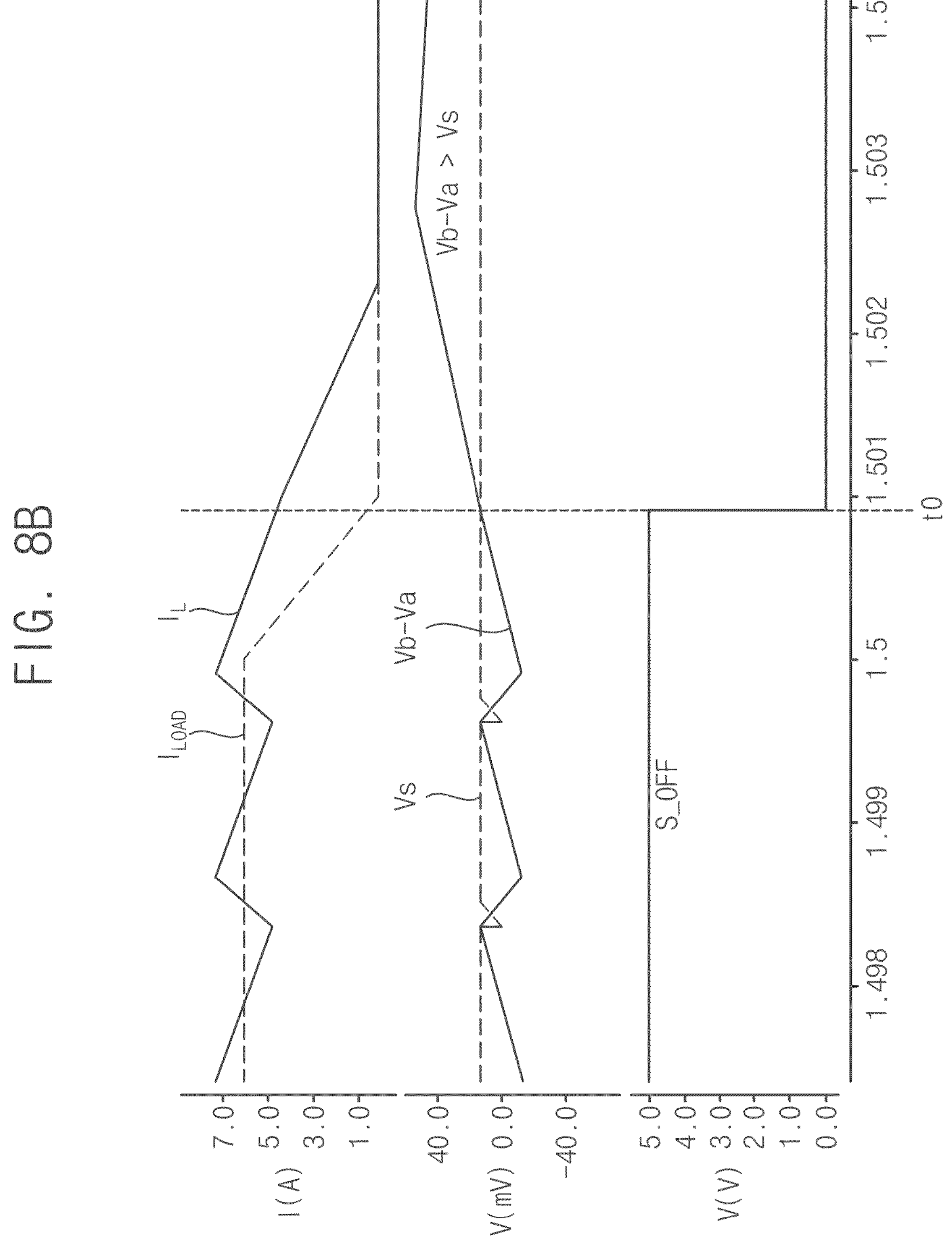
FIG. 8B is an enlarged view of a region in FIG. 8A where an absolute value of a slope of decreasing an inductor current increases in an overshooting situation.

FIG. 8A is a timing diagram illustrating an operation of a buck converter according to example embodiments due to the change in the load current $I_{LOAD}$. FIG. 8B is an enlarged view of a region in FIG. 8A where the absolute value of the slope of decreasing the inductor current $I_L$ increases in the overshooting situation.

Referring to FIGS. 8A and 8B, the load current $I_{LOAD}$ may be transitioned or changed from a relatively heavy load current to a relatively light load current. At time point t0, when the signal P2B is a logic high level and the voltage (Vb−Va) becomes higher that the half voltage Vs, the signal S8 may be activated to a logic high level, and when the signal S9 is activated as a logic high level, the switching off signal S_OFF may be transitioned from a logic high level to a logic low level. In response to the switching off signal S_OFF, the LS switch LSS included in the power switching circuit 10 may be turned off, so that the absolute value of the slope of decreasing the inductor current $I_L$ increases. At time point t1, when the voltage (Vb−Va) becomes lower that the half voltage Vs, the switching off signal S_OFF may be transitioned back to the logic high level, and the buck converter may enter the steady state with a relatively light load current. As illustrated in FIG. 8B, when (Vb−Va)>Vs at time point t0, the LS switch LSS may be turned off and the slope of decreasing the inductor current $I_L$ may be changed more significantly.

Figure 9:
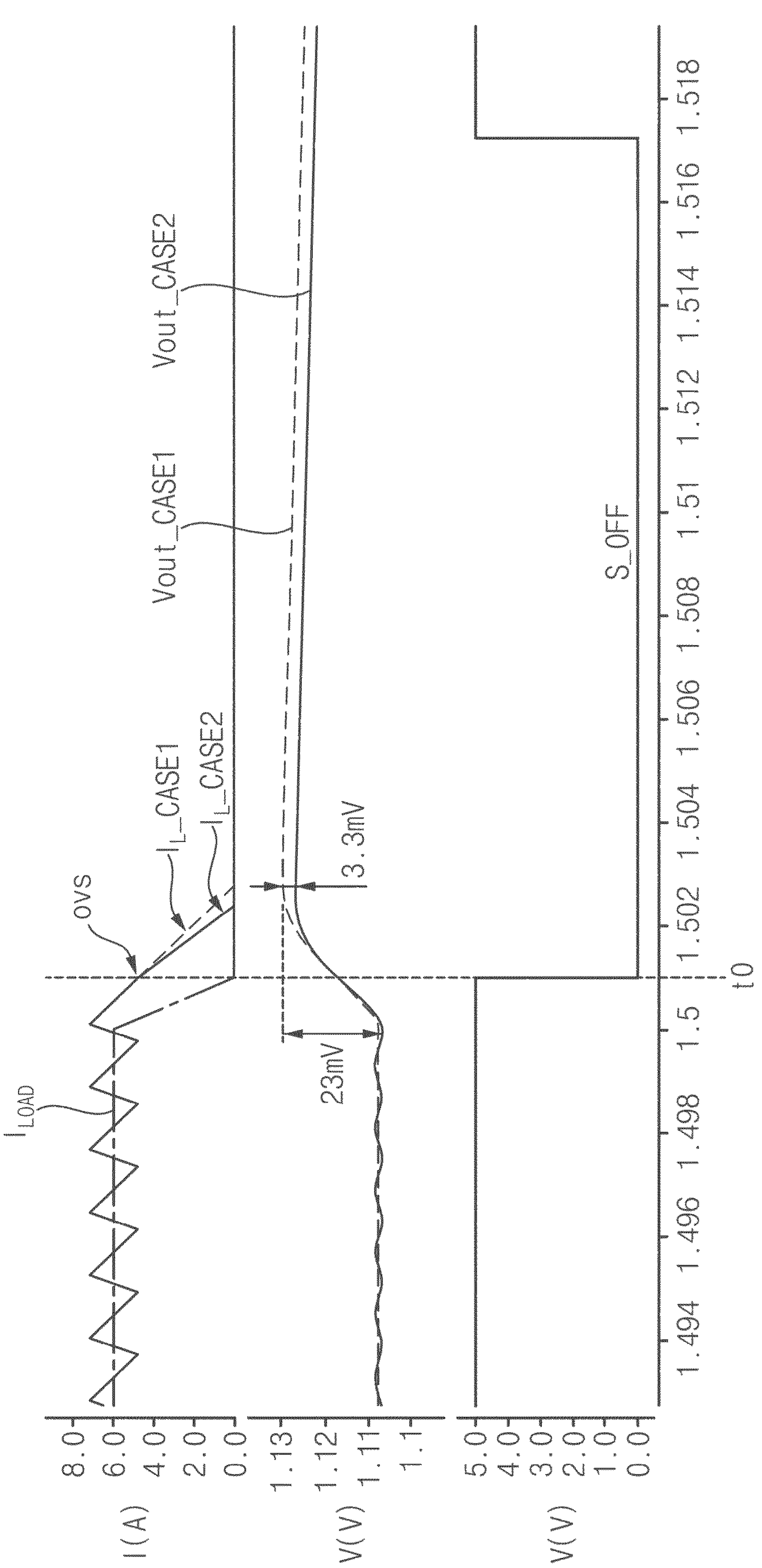
FIG. 9 is a timing diagram illustrating an overshooting of a conventional buck converter and an overshooting of a buck converter according to example embodiments.

FIG. 9 is a timing diagram illustrating an overshooting of a conventional buck converter and an overshooting of a buck converter according to example embodiments.

Referring to FIG. 9, $I_L$_CASE1 and Vout_CASE1 represent an inductor current and an output voltage of a conventional buck converter, respectively. $I_L$_CASE2 and Vout_CASE2 represent an inductor current and an output voltage of the buck converter according to example embodiments, respectively. At time point t0 when the switching off signal S_OFF is transitioned to the logic low level, an absolute value of the slope of decreasing the inductor current of the buck converter according to example embodiments may be greater than an absolute value of the slope of decreasing the inductor current of the conventional buck converter. In other words, the slope of decreasing the inductor current of the buck converter according to example embodiments may be sharper than the slope of decreasing the inductor current of the conventional buck converter. As the absolute value of the slope of decreasing the inductor current of the buck converter according to example embodiments increases, the output voltage of the buck converter according to example embodiments may be lower than the overshooting voltage (e.g., about or exactly 23 mV) of the conventional buck converter by about or exactly 3.3 mV.

Figure 10:
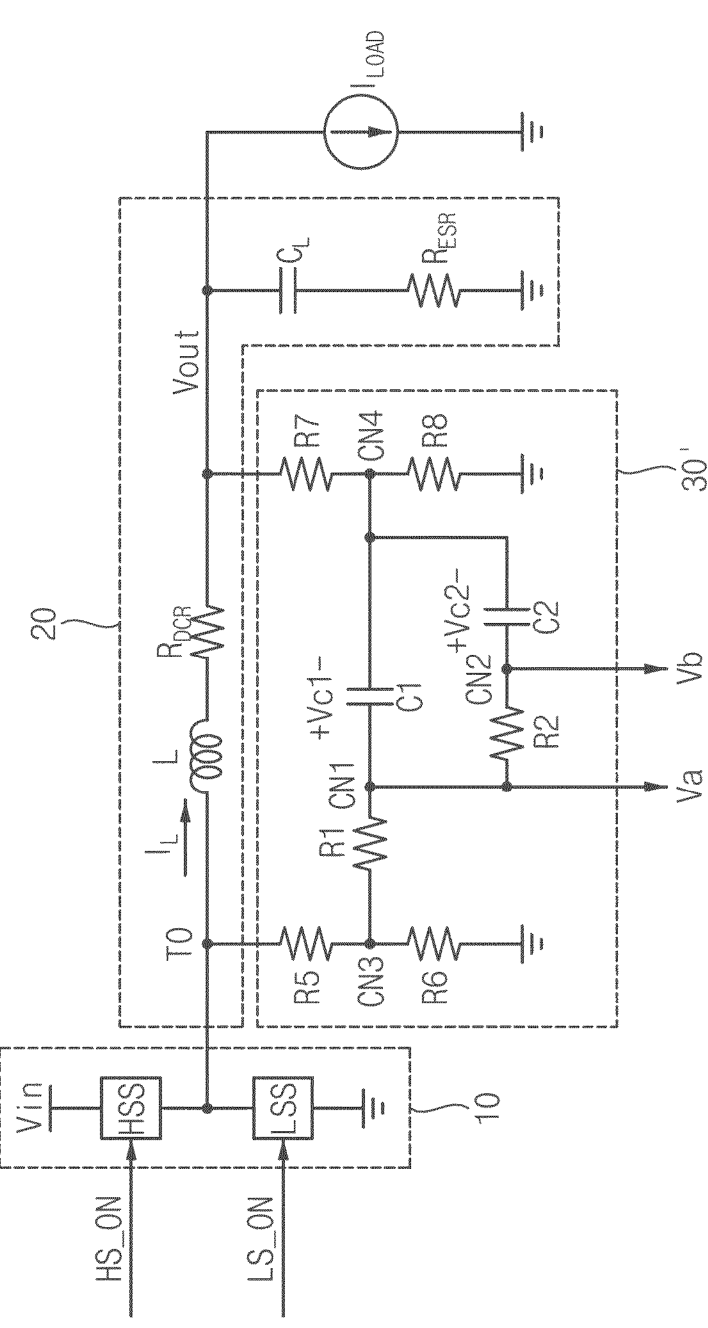
FIG. 10 is a circuit diagram illustrating an example of a sensing voltage generator in FIG. 2.

FIG. 10 is a circuit diagram illustrating an example of a sensing voltage generator in FIG. 2.

Referring to FIG. 10, a sensing voltage generator 30' in FIG. 10 may be the same or substantially the same as the sensing voltage generator 30 in FIG. 3, except that the sensing voltage generator 30' further includes resistors R5, R6, R7, and R8. The resistors R5 and R6 may be connected in series between the output terminal TO and the ground voltage Vss, and the resistors R7 and R8 may be connected in series between the second end of the inductor L and the ground voltage Vss. One end of the resistor R1 may be connected to a common node CN3 of the resistors R5 and R6, and one end of the capacitor C1 may be connected to a common node CN4 of the resistors R7 and R8. The sensing voltage generator 30' may not be directly connected between the output terminal TO and the second end of the inductor L (e.g., the feedback terminal TF), and may be connected at middle nodes (e.g., the common nodes CN3 and CN4) of resistor dividers (e.g., the resistors R5, R6, R7, and R8). In applications where the input voltage Vin is relatively high, the resistor dividers may be used to improve the withstand voltage characteristics of the capacitor C1 connected in parallel with the resistors R5, R6, R7, and R8.

Figure 11:
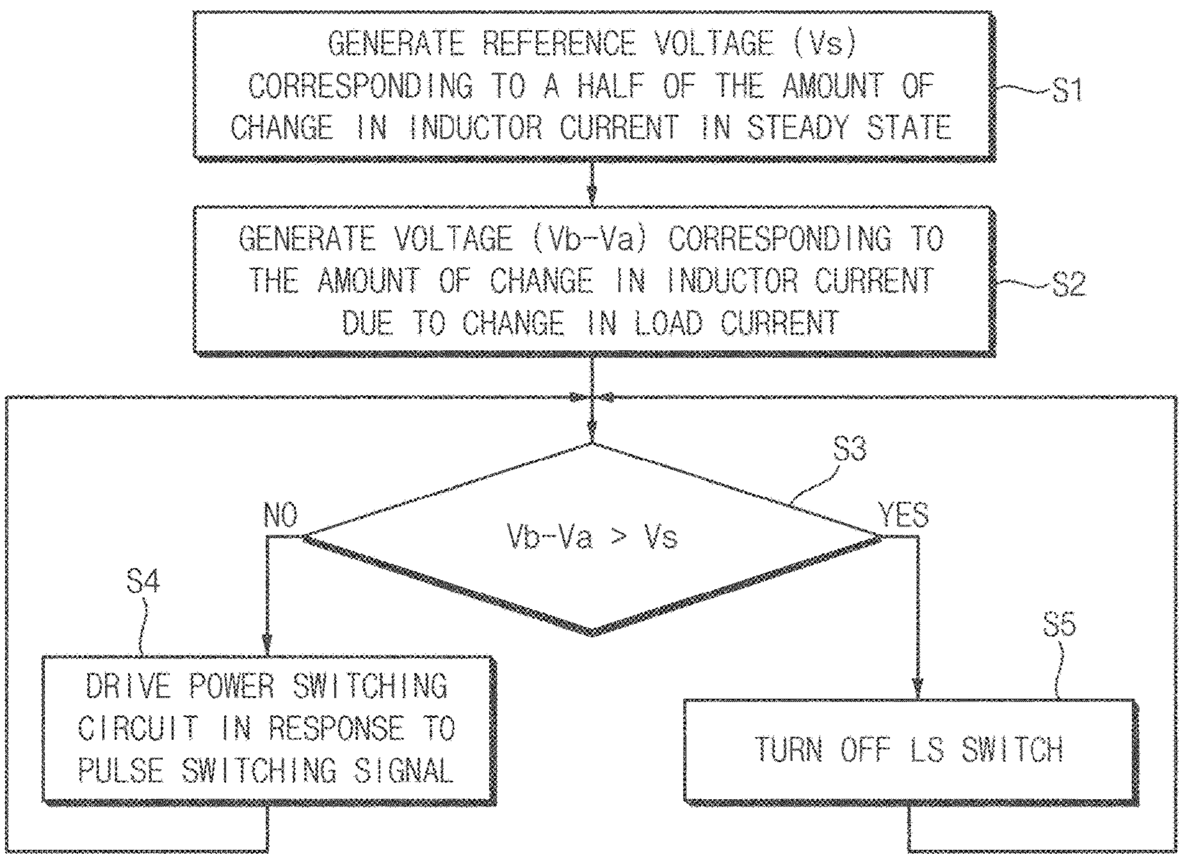
FIG. 11 is a flowchart illustrating a method of operating a buck converter according to example embodiments.

FIG. 11 is a flowchart illustrating a method of operating a buck converter according to example embodiments.

Referring to FIGS. 3 and 11, the buck converter 100 may generate the reference voltage Vs corresponding to a half of the amount of change in the inductor current $I_L$ in the steady state (operation S1). For example, the reference voltage Vs may be generated during the activation time interval of the half signal P2 using the current source 12 and the capacitor C4 included in the first reference voltage generator 53 of buck converter 100.

The buck converter 100 may generate the voltage (Vb−Va) corresponding to the amount of change in the inductor current $I_L$ due to the change in the load current $I_{LOAD}$ (operation S2). For example, the sensing voltage generator 30 of buck converter 100 may generate the voltage Va at the first common node CN1 and the voltage Vb at the second common node CN2, and the comparator CP4 of buck converter 100 may generate the voltage (Vb−Va) by subtracting the voltage Va at the first common node CN1 from the voltage Vb at the second common node CN2.

The comparator CP4 of the buck converter 100 may determine whether the voltage (Vb−Va) is higher than the reference voltage Vs (operation S3). When the voltage (Vb−Va) (Vb−Va) is lower than the reference voltage Vs, the overshooting detector 50 of the buck converter 100 may generate the switching off signal S_OFF representing the steady state, and the driver circuit 60 may drive the HS switch HSS switch and the LS switch LSS included in the power switching circuit 10 in response to the pulse switching signal PWM such that the HS switch HSS switch and the LS switch LSS are alternately turned on (operation S4). When the voltage (Vb−Va) is higher than the reference voltage Vs, the overshooting detector 50 of the buck converter 100 may generate the switching off signal S_OFF representing the overshooting, and the driver circuit 60 may turn off the LS switch LSS included in the power switching circuit 10 regardless of (for example, independently of or without a condition to) the pulse switching signal PWM (operation S5). When the LS switch LSS is turned off, the absolute value of the slope of decreasing the inductor current may increase. Therefore, the inductor current $I_L$ accumulated in the load capacitor $C_L$ may be reduced, thereby minimizing or reducing the overshooting on the output voltage Vout. For example, operations S3, S4 and S5 may be repeatedly performed.

For example, the absolute value of the slope of decreasing the inductor current when the LS switch LSS is turned off in operation S5 may be greater than the absolute value of the slope of decreasing the inductor current when the LS switch LSS is turned on in operation S4. For example, operation S1 may be performed during the activation time interval of the half signal P2, which is activated only for a half of the activation time interval Ton of the pulse switching signal PWM. For example, the turn-on time interval of the HS switch HSS may be equal to the activation time interval Ton of the pulse switching signal PWM.

Figure 12:
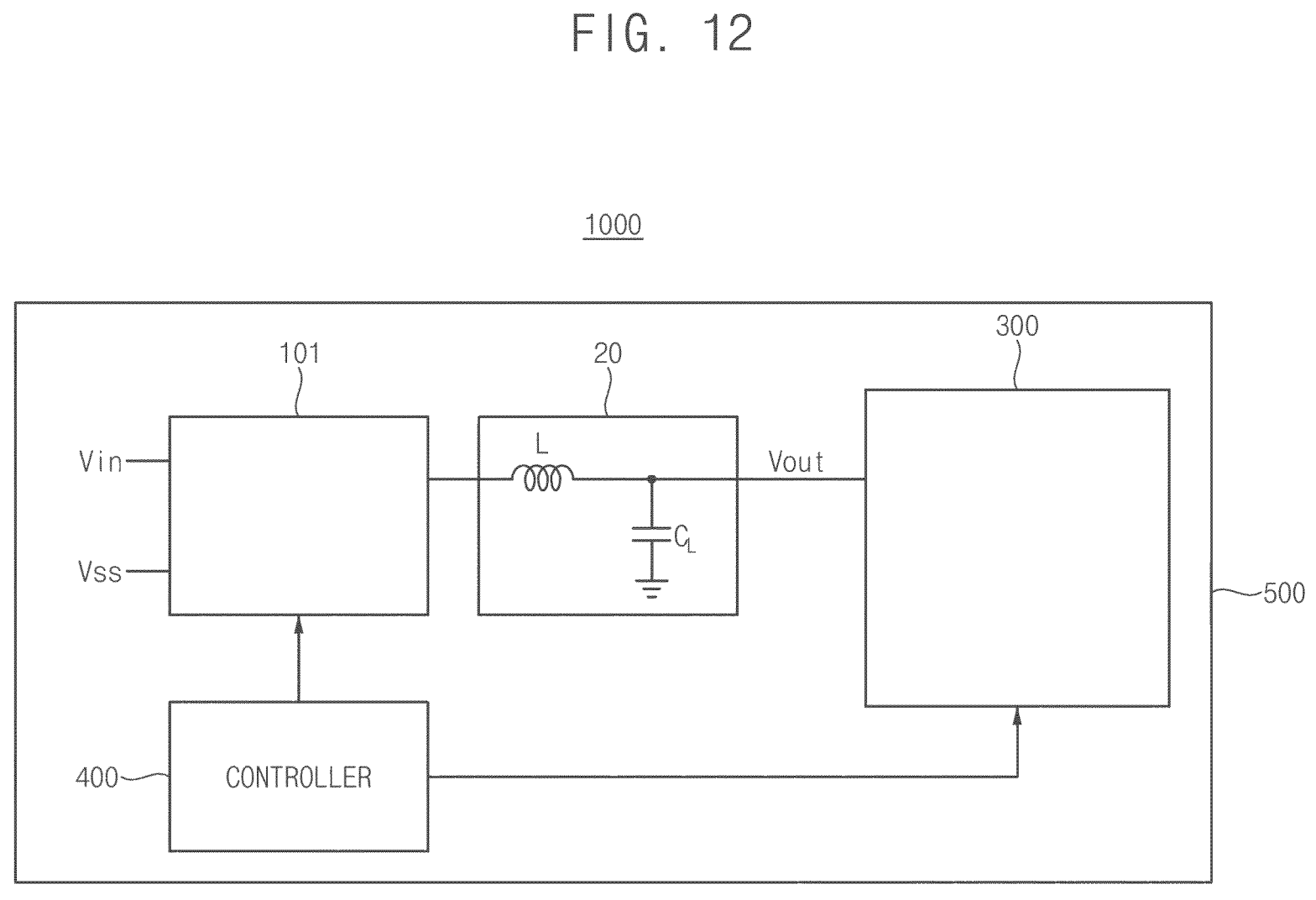

FIG. 12 is a block diagram illustrating an electronic device including a buck converter according to example embodiments.

Referring to FIG. 12, an electronic device 1000 may include a first semiconductor chip 101, a second semiconductor chip 300 and an LC filter 20, and may further include a printed circuit board (PCB) 500 on which the first semiconductor chip 101, the second semiconductor chip 300 and the LC filter 20 are mounted.

The first semiconductor chip 101 and the LC filter 20 may form the buck converter 100 of FIG. 2 and/or FIG. 10. For example, the first semiconductor chip 101 may include the power switching circuit 10, the sensing voltage generator 30, the pulse switching signal generator 40, the overshooting detector 50 and the driver circuit 60. The power switching circuit 10 may receive the input voltage Vin from a battery (not illustrated), and may alternately transfer the input voltage Vin and the ground voltage Vss to the output terminal TO in response to the pulse switching signal PWM having the activation time interval and the deactivation time interval. The LC filter 20 may generate the output voltage Vout by low-pass filtering the voltage at the output terminal TO. The second semiconductor chip 300 may receive the output voltage Vout as a power supply voltage, and may consume the load current $I_{LOAD}$. For example, the second semiconductor chip 300 may be or may include one of a memory or a central processing unit (CPU) with computational capability.

In some example embodiments, the first semiconductor chip 101 included in the electronic device 1000 may further include one of a linear regulator (e.g., low dropout (LDO) regulator) and a DC-DC converter having different type from the buck converter.

In the electronic device 1000 according to example embodiments, the buck converter 100 may provide a stable output voltage Vout to the second semiconductor chip 300 (e.g., the load device) even if the operating state of the second semiconductor chip 300 is changed, and thus stable performance may be implemented. For example, even if the operation of the second semiconductor chip 300 is changed from consuming a relatively heavy load current to consuming a relatively light load current, the buck converter 100 including the first semiconductor chip 101 and the LC filter 20 may detect the overshooting, may increase the absolute value of the slope of decreasing the inductor current $I_L$, and the change in the output voltage Vout may be minimized or reduced. Accordingly, the stable performance of the electronic device 1000 may be guaranteed.

The example embodiments may be applied to various electronic devices and systems that include the buck converters. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A buck converter comprising:

a power switching circuit including a high side (HS) switch and a low side (LS) switch, the power switching circuit configured to alternately transfer an input voltage and a ground voltage to an output terminal through the HS switch and the LS switch in response to a pulse switching signal;

an inductor having a first end connected to the output terminal and a second end connected to a load capacitor, the inductor configured to generate an output voltage at the second end;

a sensing voltage generator configured to generate a first voltage and a second voltage, the sensing voltage generator including:

a first resistor and a first capacitor connected in series between the output terminal and the second end of the inductor, the first voltage being a voltage at a first common node between the first resistor and the first capacitor; and a second resistor and a second capacitor connected in series between the first common node and the second end of the inductor, the second voltage being a voltage at a second common node between the second resistor and the second capacitor; and an overshooting detector configured to generate a switching off signal in response to a first reference voltage, the first voltage and the second voltage, and generate the first reference voltage based on replicating a current flowing through the first common node during a half of a turn-on time interval of the HS switch, the power switching circuit is further configured to based on the switching off signal being in a first state, the HS switch and the LS switch are alternately turned on in response to the pulse switching signal, and based on the switching off signal being in a second state, the LS switch is turned off.

2. The buck converter of claim 1, wherein the LS switch is a metal oxide semiconductor field effect transistor (MOSFET) with a parasitic diode between a source and a drain, and the power switching circuit is configured to, based on the switching off signal being in the second state, turn on the parasitic diode.

3. The buck converter of claim 2, further comprising:

a pulse switching signal generator configured to generate the pulse switching signal having an activation time interval equal to the turn-on time interval.

4. The buck converter of claim 3, wherein the pulse switching signal generator includes:

a set generator including a first comparator configured to generate a first signal in response to the first voltage, the second voltage, the output voltage and a second reference voltage;

a reset generator configured to generate a second signal in response to a ramp voltage and a third reference voltage, the ramp voltage being generated from an activation time point of the pulse switching signal; and a first latch configured to activate the pulse switching signal in response to the first signal, and to deactivate the pulse switching signal in response to the second signal.

5. The buck converter of claim 4, wherein each of the second reference voltage and the third reference voltage is associated with a target voltage of the buck converter or the output voltage of the buck converter.

6. The buck converter of claim 4, wherein the overshooting detector includes:

a half signal generator configured to activate a half signal in response to the first signal, and to deactivate the half signal in response to the ramp voltage and a fourth reference voltage;

a first reference voltage generator configured to generate the first reference voltage during an activation time interval of the half signal; and a second comparator configured to generate a first internal signal in response to the first voltage, the second voltage and the first reference voltage, the first internal signal is activated in response to a voltage obtained by subtracting the first voltage from the second voltage being higher than the first reference voltage, and the first internal signal is deactivated in response to the voltage obtained by subtracting the first voltage from the second voltage being lower than or equal to the first reference voltage.

7. The buck converter of claim 6, wherein the fourth reference voltage is a half of the third reference voltage.

8. The buck converter of claim 7, wherein the voltage obtained by subtracting the first voltage from the second voltage is changed with respect to 0V.

9. The buck converter of claim 8, wherein the first reference voltage is equal to a voltage corresponding to a half of an amount of change in an inductor current flowing through the inductor during the turn-on time interval.

10. The buck converter of claim 8, wherein the first reference voltage generator includes:

a first current source configured to generate a current, an amount of the current generated from the first current source being obtained by (Vin−Vout)/R1, where R1 denotes a resistance equal to a resistance of the first resistor, Vin denotes the input voltage, and Vout denotes the output voltage; and a third capacitor having a capacitance equal to a capacitance of the first capacitor.

11. The buck converter of claim 10, wherein the overshooting detector further includes:

a logic circuit configured to receive the first internal signal and an inverted signal of the half signal, to generate the switching off signal having the first state in response to the first internal signal being deactivated or the half signal being activated, and to generate the switching off signal having the second state in response to the first internal signal being activated and the half signal being deactivated.

12. The buck converter of claim 10, wherein the overshooting detector further includes:

a delay circuit configured to generate a second internal signal by delaying the first internal signal; and a logic circuit configured to receive the second internal signal and an inverted signal of the half signal, to generate the switching off signal having the first state in response to the second internal signal being deactivated or the half signal being activated, and to generate the switching off signal having the second state in response to the second internal signal being activated and the half signal being deactivated.

13. The buck converter of claim 12, further comprising:

a driver circuit configured to drive the power switching circuit in response to the pulse switching signal when the switching off signal is in the first state, and to turn off the LS switch included in the power switching circuit regardless of the pulse switching signal based on the switching off signal being in the second state.

14. A method of operating a buck converter, the method comprising:

generating a reference voltage corresponding to a half of an amount of change in an inductor current in a steady state;

generating a first voltage corresponding to an amount of change in the inductor current due to a change in a load current;

sensing a first state in which the first voltage is higher than the reference voltage; and turning off a low side (LS) switch in response to the first state regardless of a pulse switching signal, the LS switch being included in a power switching circuit included in the buck converter.

15. The method of claim 14, further comprising:

sensing a second state in which the first voltage is lower than the reference voltage; and alternately turning on a high side (HS) switch and the LS switch in response to the second state and the pulse switching signal, the HS switch being included in the power switching circuit.

16. The method of claim 15, wherein an absolute value of a slope of decreasing the inductor current based on the LS switch being turned off in response to the first state is greater than an absolute value of a slope of decreasing the inductor current based on the LS switch being turned on in response to the second state.

17. The method of claim 16, wherein the reference voltage is generated during an activation time interval of a half signal, which is activated during a half of an activation time interval of the pulse switching signal.

18. The method of claim 17, wherein a turn-on time interval of the HS switch is equal to the activation time interval of the pulse switching signal.

19. An electronic device comprising:

a first semiconductor chip including a power switching circuit including a high side (HS) switch and a low side (LS) switch;

an inductor and a load capacitor connected to an output terminal of the power switching circuit, and configured to generate an output voltage; and a second semiconductor chip configured to receive the output voltage as a power supply voltage, and to consume a load current, the first semiconductor chip configured to generate a reference voltage corresponding to an amount of change in an inductor current flowing through the inductor during a half of a turn-on time interval of the HS switch, generate a first voltage corresponding to an amount of change in the inductor current due to a change in the load current, and adjust a slope of decreasing the inductor current depending on the reference voltage and the first voltage.

20. The electronic device of claim 19, wherein an absolute value of the slope of decreasing the inductor current based on the first voltage being higher than the reference voltage is greater than an absolute value of the slope of decreasing the inductor current based on the first voltage being lower than the reference voltage.

* * * * *